United States Patent
van Lunteren (10) Patent No.: US 9,990,583 B2
(45) Date of Patent: Jun. 5, 2018

(54) MATCH ENGINE FOR DETECTION OF MULTI-PATTERN RULES

(71) Applicant: International Business Machines Corporation, Armonk, NY (US)

(72) Inventor: Jan van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/976,295

(22) Filed: Dec. 21, 2015

(65) Prior Publication Data

US 2016/0104068 A1 Apr. 14, 2016

Related U.S. Application Data

(63) Continuation of application No. 14/619,739, filed on Feb. 11, 2015, now Pat. No. 9,256,831, which is a
(Continued)

(51) Int. Cl.
*G06N 5/02* (2006.01)
*G06F 17/30* (2006.01)
(Continued)

(52) U.S. Cl.
CPC ....... *G06N 5/025* (2013.01); *G06F 17/30386* (2013.01); *G06F 21/561* (2013.01);
(Continued)

(58) Field of Classification Search
CPC .................................................. G06N 5/025
(Continued)

(56) References Cited

U.S. PATENT DOCUMENTS

2005/0154916 A1 7/2005 Boulanger et al.
2005/0273857 A1 12/2005 Freund
(Continued)

OTHER PUBLICATIONS

Van Lunteren, "High-Performance Pattern-Matching for Intrusion Detection," INFOCOM 2006, 25th IEEE International Conference on Computer Communications, Proceedings of, vol., no., pp. 1-13, Apr. 2006 doi: 10.1109/INFOCOM.2006.204 URL: http://ieeexplore.ieee.org/stamp/stamp.jsp?tp=tp=&arnumber=4146857&isnumber=4146653.
(Continued)

*Primary Examiner* — Alan S Chen
*Assistant Examiner* — Ola Olude Afolabi
(74) *Attorney, Agent, or Firm* — Scully, Scott, Murphy & Presser, P.C.; Daniel P. Morris, Esq.

(57) ABSTRACT

Methods, systems and computer program products are disclosed for detecting patterns in a data stream that match multi-pattern rules. One embodiment of the invention provides a method of recognizing a specified group of patterns in a data stream. The method comprises identifying a rule for said specified group of patterns in the data stream, and using a first array of finite state machines to scan the data stream for at least some of the patterns in the specified group. For patterns in the specified group that are found in the data stream by the first array of finite state machines, pattern identifiers are sent to a second array of finite state machines. The second array of finite state machines determines if the specified group of patterns is in the data stream in accordance with the identified rule by, at least in part, using said pattern identifiers.

20 Claims, 5 Drawing Sheets

SINGLE-THREADED B-FSM ENGINE

Related U.S. Application Data continuation of application No. 14/063,554, filed on Oct. 25, 2013, now Pat. No. 9,015,102, which is a continuation of application No. 12/533,616, filed on Jul. 31, 2009, now Pat. No. 8,572,016.

(51) Int. Cl.
  *G06N 5/04* (2006.01)
  *H04L 29/06* (2006.01)
  *G06F 21/56* (2013.01)

(52) U.S. Cl.
  CPC ............ *G06N 5/047* (2013.01); *H04L 65/60* (2013.01); *G06F 2221/034* (2013.01)

(58) Field of Classification Search
  USPC .......................................................... 706/47
  See application file for complete search history.

(56) References Cited

U.S. PATENT DOCUMENTS

| | | | |
|---|---|---|---|
| 2007/0124146 A1* | 5/2007 | Lunteren | H04L 63/1408 704/255 |
| 2007/0233628 A1 | 10/2007 | Sherwood et al. | |
| 2007/0282573 A1 | 12/2007 | Fritz et al. | |

OTHER PUBLICATIONS

Van Lunteren, et al., "Fast and Scalable Packet Classification," IEEE Journal on Selected Areas in Communications, May 2003, pp. 560-571, vol. 21, No. 4.

Van Lunteren, "High-Performance Pattern-Matching for Intrusion Detection," Proc. IEEE Infocom, Apr. 2006, Barcelona, Spain.

Van Lunteren, "High-Performance Pattern-Matching Engine for Intrusion Detection," Hot Chips 17, Aug. 2005, Stanford University, Palo Alto, CA.

Van Lunteren, et al., "XML Accelerator Engine", First Int. Workshop on High Performance XML Processing in conjunction with WWW2004, May 2004.

Van Lunteren, J., "Searching Very Large Routing Tables in Wide Embedded Memory", Proc. IEEE Globecom, Nov. 2001, pp. 1615-1619, vol. 3.

* cited by examiner

FIG. 1

FIG. 2 STATE TRANSITION DIAGRAM FOR MULTI-PATTERN RULE MR1

FIG. 3 STATE TRANSITION DIAGRAM FOR MULTI-PATTERN RULE MR2

FIG. 4
SINGLE-THREADED B-FSM ENGINE

MATCH ENGINE FOR DETECTION OF MULTI-PATTERN RULES

CROSS-REFERENCE TO RELATED APPLICATION

This application is a continuation of copending U.S. patent application Ser. No. 14/619,739, filed Feb. 11, 2015, which is a continuation of U.S. patent application Ser. No. 14/063,554, filed Oct. 25, 2013, which is a continuation of U.S. patent application Ser. No. 12/533,616, filed Jul. 31, 2009, now U.S. Pat. No. 8,572,016. The entire contents and disclosures of U.S. patent applications Ser. Nos. 14/619,739, 14/063,554 and 12/533,616 are hereby incorporated herein by reference.

BACKGROUND OF THE INVENTION

Field of the Invention

The present invention relates to methods and systems for detecting patterns in a data stream that match multi-pattern rules.

Background Art

The detection of a particular pattern in a data stream is used in many computing environments. For example, in fields such as virus detection, the data stream that is being received by a computer will need to be monitored for the presence of viruses. The virus checker will be able to recognize specific viruses and also viruses of generic types. The virus checker will have access to a data structure that includes a large number of different patterns, probably over a thousand in number. The patterns can comprise simple character sequences (strings) such as "password" or can be specified in a more flexible way, for example, using regular expressions that can include generic references to character classes and the number of occurrences of certain character and character sequences.

A data stream that is received by a computer, which needs to be analyzed, will be formed of a series of bytes, and in common protocols such as TCP/IP (used for Internet communication) these bytes will be received in the form of data packets. These data packets that form the data stream are scanned for the presence of the stored patterns as the stream is received. This scanning can be executed by software, or in some environments a dedicated ASIC or an FPGA can be used to carry out the pattern matching. If a pattern is detected, then an output signal is generated, and depending upon the application, action such as deleting the pattern from the data packet is then executed.

Existing/published approaches for pattern matching and recognition engines focus on the detection of individual patterns. Many applications for pattern matching engines, however, specify conditions at the level of multiple patterns. Typically such conditions are combined into a so called rule. One good example is intrusion detection: the Snort rules set (open source IDS system) specifies rules that employ conditions related to multiple patterns. For example, a rule can specify that if a pattern "pattern1" has been found, and if this pattern is followed in the next 100 bytes in the input stream by a second pattern "pattern2," and if the next 350 bytes do NOT contain a pattern "pattern3", then this should raise a certain alarm. Typically, the "pattern-level" conditions that are used in multi-pattern rules, relate to absolute and relative offsets within the input stream and relative to other patterns, as well as order of detection, and whether a pattern is detected or not (negation).

In conventional implementations, the above multi-pattern conditions are typically resolved in software executed at either a host processor or embedded processor. Given the increasing complexity of IDS rule sets and multi-pattern rules in particular, this is likely to become a performance bottleneck that even might become a security bottleneck, as it can be the target of Denial of Service (DOS) attacks. For example, a hacker may attempt to generate worst-case traffic that will trigger the evaluation of the most complex multi-pattern rules in order to bring the system (performance) down.

SUMMARY OF THE INVENTION

Embodiments of the invention provide methods, systems and computer program products for detecting patterns in a data stream that match multi-pattern rules. One embodiment of the invention provides a method of recognizing a specified group of patterns in a data stream. The method comprises identifying a rule for said specified group of patterns in the data stream, and using a first array of finite state machines to scan the data stream for at least some of the patterns in the specified group. For patterns in the specified group that are found in the data stream by the first array of finite state machines, pattern identifiers are sent to a second array of finite state machines. The second array of finite state machines determines if the specified group of patterns is in the data stream in accordance with the identified rule by, at least in part, using said pattern identifiers.

In one embodiment, the method is used to recognize a multitude of specified groups of patterns in the data stream. In this embodiment, the second array of finite state machines determines if the specified group of patterns is in the data stream by running a multitude of threads on the second array of finite state machines, and using that multitude of threads to determine whether the multitude of specified groups of patterns are in the data stream.

The present invention builds on the pattern-matching engine as described in J. van Lunteren, "High-Performance Pattern-Matching for Intrusion Detection", Proceedings of IEEE INFOCOM'06, Barcelona, Spain, April 2006, (van Lunteren (I)). This invention provides a new approach for handling multi-pattern rules in a very efficient, fast, elegant way, building on top of the basic (single) pattern-matching engine disclosed in van Lunteren (I).

Further benefits and features of this invention will become apparent from a consideration of the following detailed description, given with reference to the accompanying drawings, which specify and show preferred embodiments of the invention.

DETAILED DESCRIPTION OF THE PREFERRED EMBODIMENTS

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
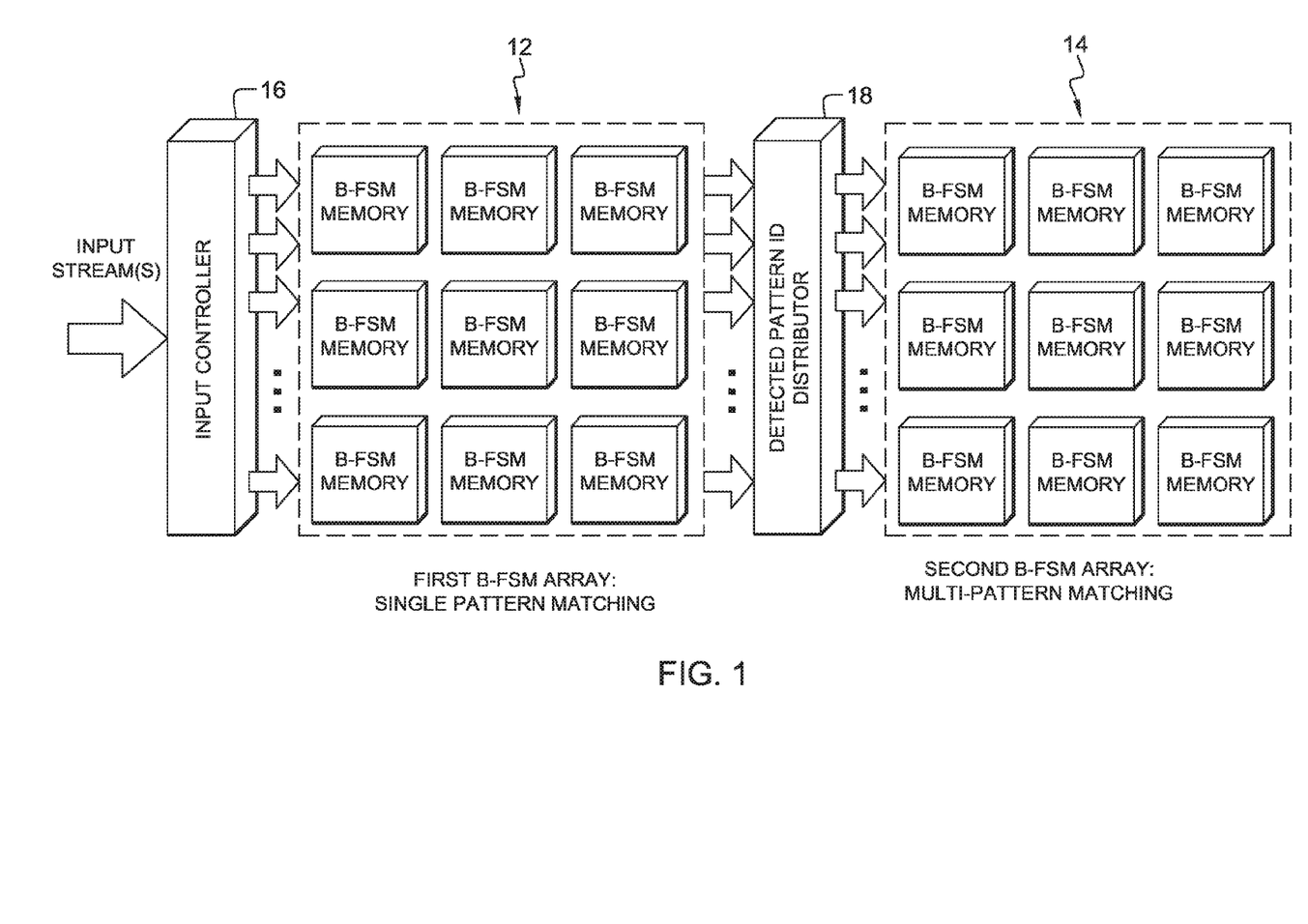
FIG. 1 shows a block diagram of a multi-pattern detection engine according to an embodiment of the invention.

One aspect of the invention will be explained with reference to FIGS. 1-3. FIG. 1 shows two arrays 12, 14 of B-FSMs (Bart based-Finite State Machines), an input controller 16, and a detected pattern ID distributor 18. The first B-FSM array 12 may comprise the basic pattern matching engine described in J. van Lunteren, "High-Performance Pattern-Matching for Intrusion Detection", Proceedings of IEEE INFOCOM'06, Barcelona, Spain, April 2006, (van Lunteren (I)) and is used to scan the input stream(s) for matching patterns. Upon detection of a pattern by any of the B-FSMs, an ID of that pattern in combination with the offset at which it has been detected will be generated as output and sent to the second B-FSM array 14 shown in FIG. 1. The first 8-FSM array 12 runs at wirespeed and checks all input characters in order to find matching patterns.

The second B-FSM array 14, although illustrated in a similar way as the first B-FSM array in FIG. 1, is substantially different with respect to its implementation, functionality, the amount of memory attached, and the way it is operated. Second array 14 is basically a multi-core/multi-threaded state machine processor that is able to execute thousands of "virtual state machines" (i.e., state transition diagrams) in a multi-threaded way. Furthermore, these state machines also support multiple conditions that allow to test and compare offsets and distances at which patterns have been detected, e.g., using equal to, less than and greater than.

The operation of an embodiment of the invention will be explained below using the following example involving two multi-pattern rules. The first multi-pattern rule (MR1) comprises the following conditions: (1) detect pattern P1 at offset 50 in input stream, (2) detect pattern P2 after P1, and (3) detect pattern P3 within 100 bytes from P2. The second multi-pattern rule (MR2) comprises the following conditions: (1) detect pattern P4, and (2) detect pattern P6—between pattern detection of P4 and P6 no pattern P5 should be detected For these two rules, the state transition diagrams are created that are shown in FIGS. 2 and 3. In this case, the first B-FSM array will perform the actual detection of the patterns P1 to P5 in the input streams, and as a result, send the pattern IDs of the patterns (which may be indicated also as P1 to P5) together with the offset at which these patterns have been detected (denoted as "offset1" to "offset5") to the second B-FSM array, where they serve as input to a selected "virtual" state machine or, called differently, a "state machine thread".

Figures 2, 3:
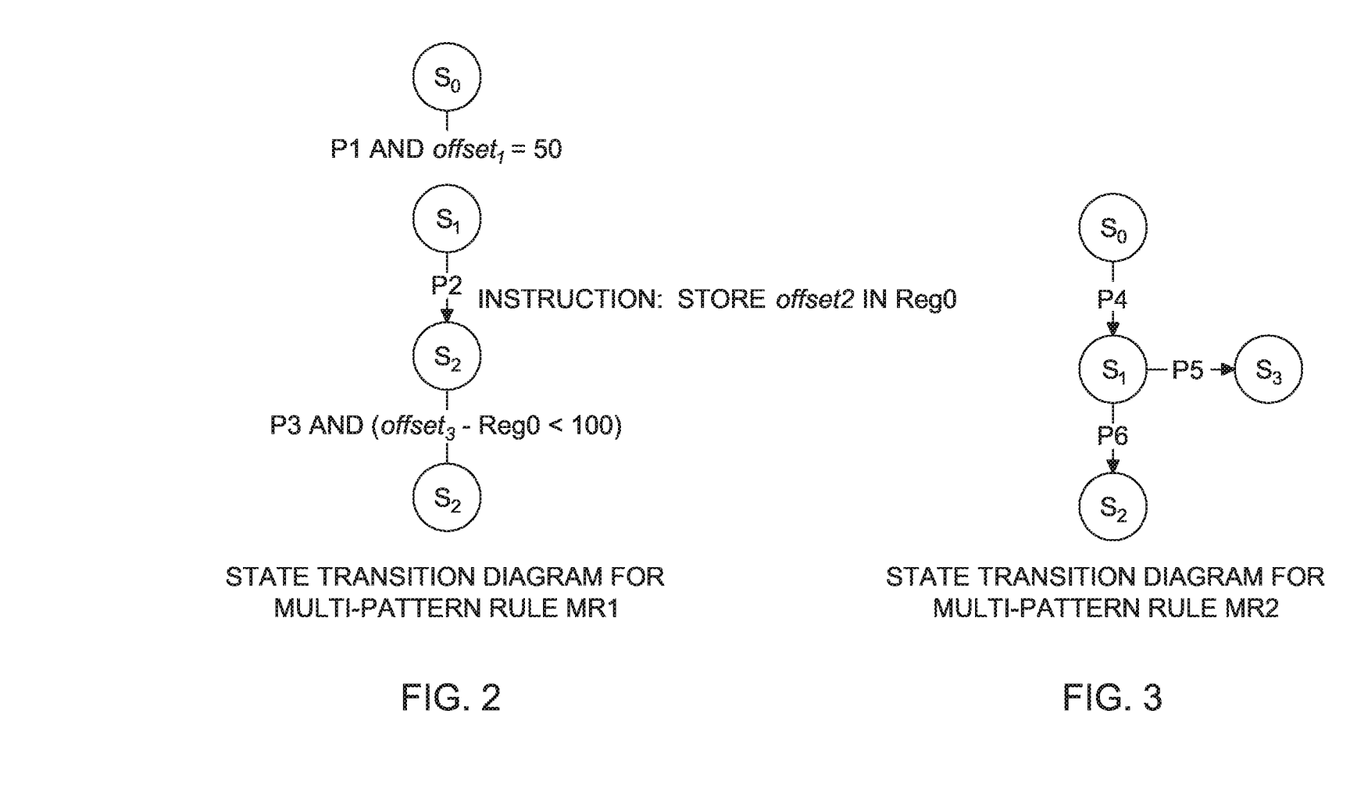
FIG. 2 is a first state transition diagram used to detect a first multi-pattern rule.
FIG. 3 is a second state transition diagram used to detect a second multi-pattern rule.

The state diagram shown in FIG. 2 shows a transition between the initial state S0 and state S1, which will be executed when the input to the state machine is comprised of the identifier of pattern P1 and if the offset associated with that pattern identifier equals 50. If the state machine is in state S1 and a pattern identifier P2 is received, then a transition to state S2 is performed, which also will trigger the execution of an instruction that will store the offset associated with pattern identifier P2 in a selected local register, in this case Register 0 (Reg0).

From state S2, a transition will be made if the input equals a pattern identifier P3 and the difference between the offset associated with this identifier and the value of register 0 is less than 100. Arrival at state S3 means that the multi-pattern conditions specified by rule MR1 have been matched by the input stream.

In a similar way, the state diagram shown in FIG. 3 implements the match conditions for rule MR2: arrival at state S2 of FIG. 3 means that the multi-pattern conditions specified by rule MR2 have been matched by the input stream. As can be seen easily, state S2 will only be reached if the input is comprised of a pattern identifier P4 followed by P6 with no P5 in between.

The detected pattern ID distributor 18 shown in FIG. 1, will ensure that only pattern identifiers will be received by a given state machine thread corresponding to a particular multi-pattern rule, that are relevant for that thread. Other pattern identifiers that are not relevant for that thread will be sent to one (or multiple) other threads for which these other pattern identifiers are relevant.

One important aspect of embodiments of the invention is that the pattern identifier will include information (i.e., an ID) of the state machine thread that will process it in the second B-FSM array. Furthermore, the pattern identifier can be encoded such that the storage requirements of the processing state machine thread can be optimized. Similar to state encoding, this provides full control of the encoding of the pattern ID and, consequently, of the encoding of the input to the B-FSM threads executed by the second B-FSM array Another aspect of embodiments of the invention is the handling of rules that have common patterns.

In the above examples, each state transition diagram that will be executed as a separate B-FSM thread, relates only to a single rule. If rules share one or more patterns, then upon detection of these patterns, the corresponding IDs can be sent to multiple B-FSM threads, each of which relates to these rules. Alternatively, these multiple rules can be combined into a single state transition diagram that is executed by one single B-FSM thread, with various states in the diagram corresponding to one or multiple of these rules being matched by the input stream.

As discussed above, embodiments of the invention use an array of finite state machines. A finite state machine (FSM) is a model of behavior composed of states, transitions and actions. A state stores information about the past, i.e., it reflects the input changes from the start to the present moment. A transition indicates a state change and is described by a condition that would need to be fulfilled to enable the transition. An action is a description of an activity that is to be performed at a given moment. A specific input action is executed when certain input conditions are fulfilled at a given present state. For example, an FSM can provide a specific output (e.g., a string of binary characters) as an input action.

An FSM can be represented using a set of (state) transition rules that describes a state transition function. State transition diagrams are used to graphically represent FSMs. Classic forms of state transition diagrams are directed graphs, where each edge is a transition between two states and each vertex is a state. The inputs are signified on each edge.

Controllers in a broad spectrum of devices and systems are often based on state machine engines that implement a FSM. Emerging trends, including programmable accelerators etc., require the operation of these devices, and consequently also the controller operation, to be configurable and/or programmable. For this purpose, programmable state machine engines are used.

Examples of finite state machines are described in the following papers:
1) J. van Lunteren, "A Novel Processor Architecture for High-Performance Stream Processing," *Hotchips* 18, Stanford University, Palo Alto, Calif., August 2006; and
2) J. van Lunteren et al, "XML Accelerator Engine", Proc. of First International Workshop on High Performance XML Processing, 2004.

Another important aspect of embodiments of the invention is the implementation of the multi-threaded multi-core B-FSM processor. The concept is illustrated in FIGS. 4, 5(a) and 5(b).

Figure 4:
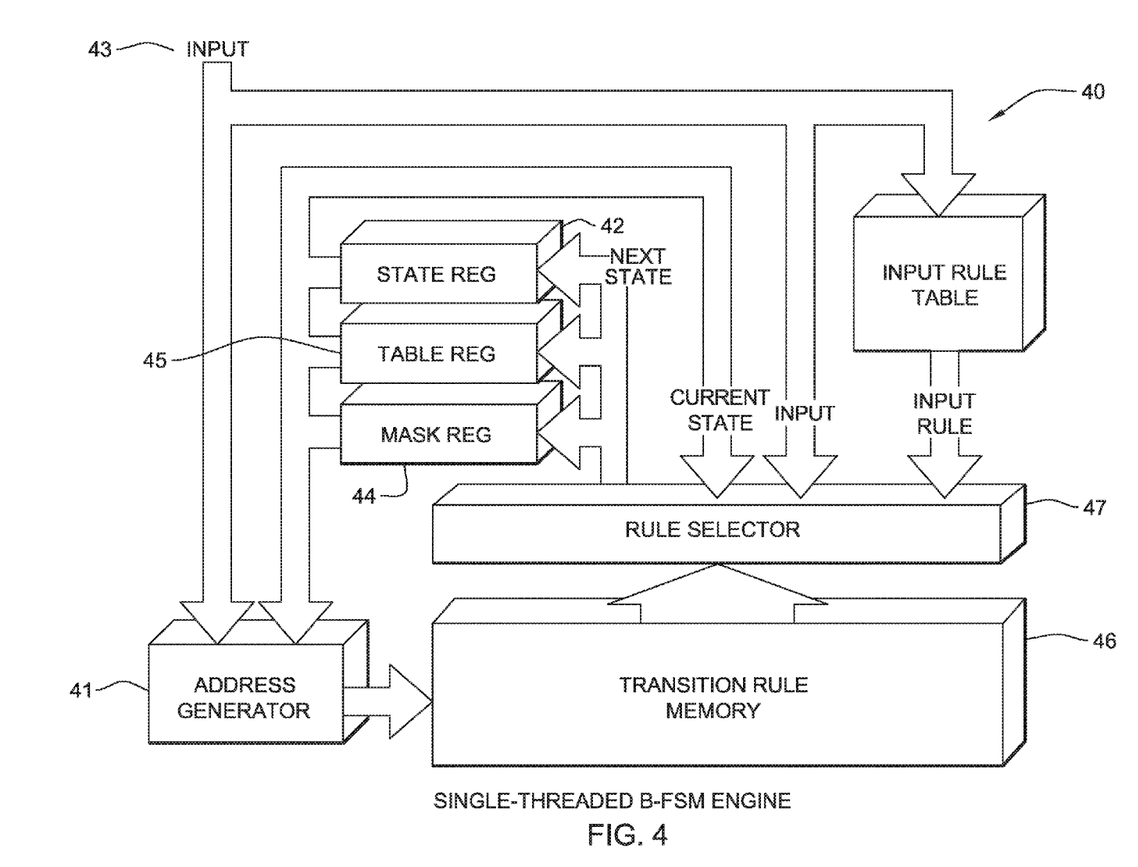
FIG. 4 illustrates a single-threaded B-FSM engine.

FIG. 4 shows the original B-FSM engine 40 that does not support multi-threading. It operates in the manner described below.

In each cycle, a hash index is derived, by Address Generator 41, from the bit positions within the current state (stored in the state register 42) and input vectors, represented at 43. These bit positions are selected using a mask stored in the mask register 44. The resulting hash index is then concatenated with the most significant address bits of the current hash table, which are contained in the table register 45 to form a memory address. Next, the transition rule memory 46 is accessed, and a hash table entry containing multiple transition rules is retrieved and compared in parallel against the actual values of the state and input by the rule selector 47. The highest-priority matching rule, as selected by the rule selector, is then used to update the state, table and mask registers.

Figure 5A:
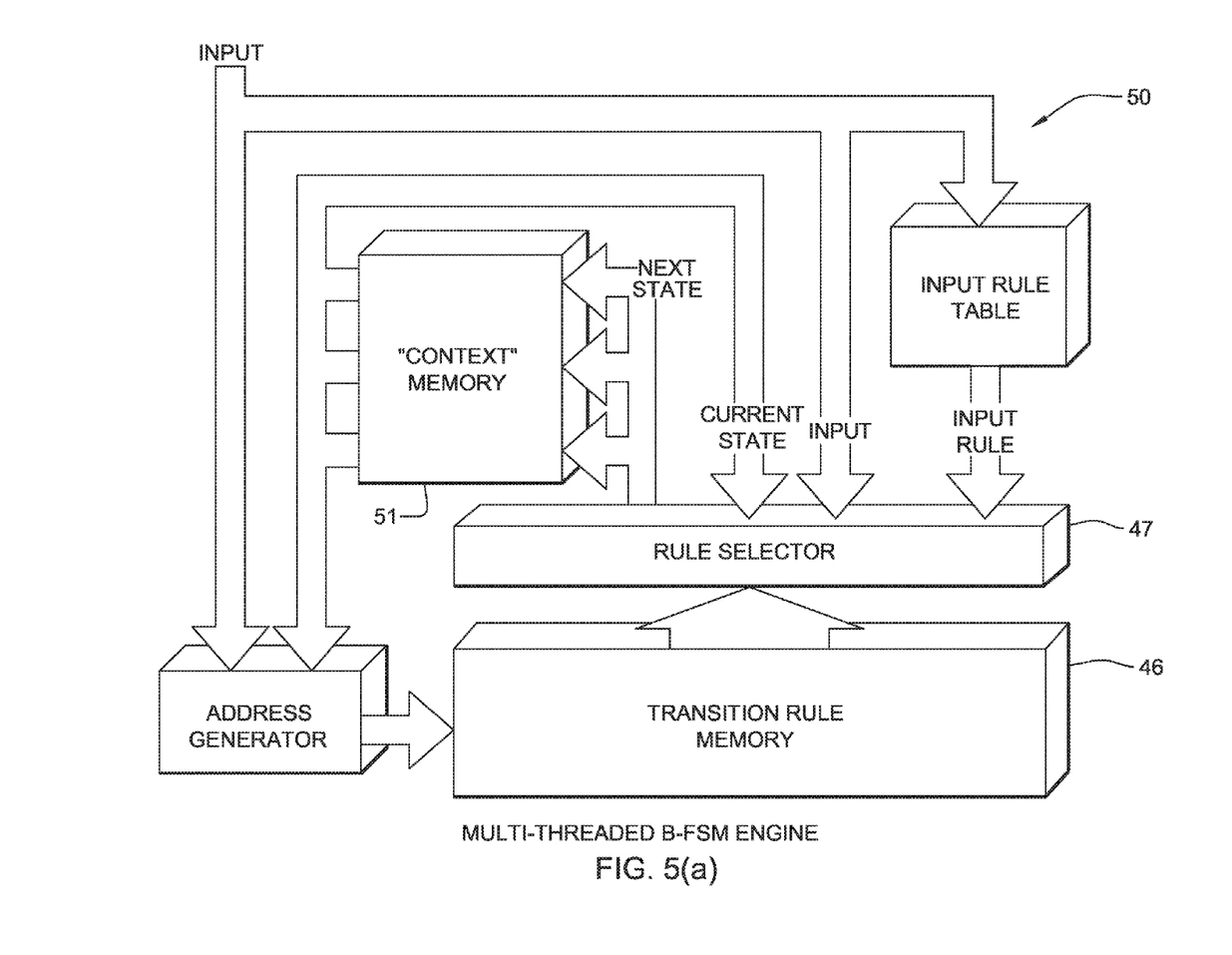
FIG. 5(a) shows a multi-threaded B-FSM engine.
Figure 5B:
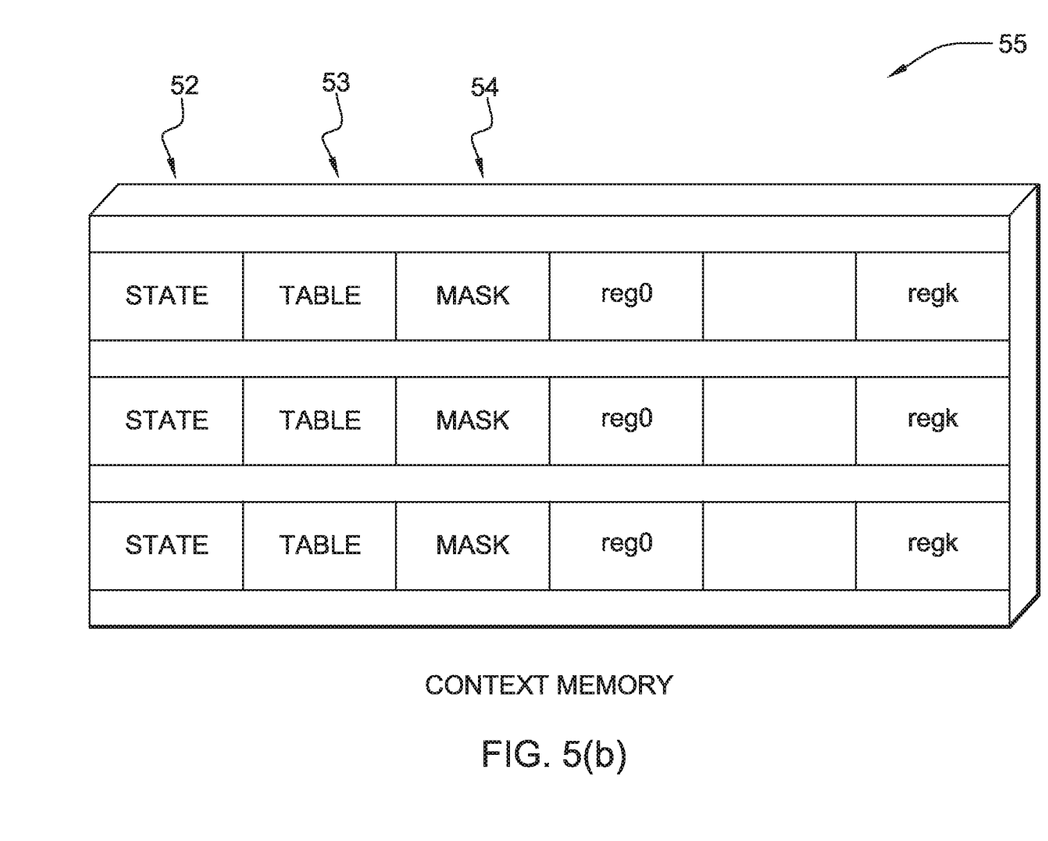
FIG. 5(b) illustrates in more detail the context memory of the B-SFM engine of FIG. 5(a).

FIG. 5(a) shows the multi-threaded B-FSM engine 50, in which the state, table and mask registers are now replaced by a memory 51 referred to as a "context memory". The contents of this memory 51 are shown in FIG. 5(b). Each entry in the context memory contains, at 52, 53 and 54, the current values of the state, table and mask registers, together with the contents of multiple special purpose register 55 (that are used for some simple arithmetic as shown in the example above—see also the above-identified J. van Lunteren (II) paper for an illustration of how arithmetic functions can be supported in a B-FSM).

As FIG. 5(b) illustrates, a transition is now executed "out of" the thread context record stored in the context memory, and the resulting updates of the state and other registers are written back into that thread context record 51. The context record is directly selected by the rule information contained in the pattern ID as described above: state machine thread ID.

Through application of pipelining, this approach allows to achieve a processing rate of one transition per clock cycle, while processing a different B-FSM thread in each clock cycle. This allows utilization of a slower but denser memory that can store tens of thousands of thread contexts, each related to one or multiple multi-pattern rules.

Compared to the register-based B-FSM engine, this will result in a slower processing rate (i.e., number of transactions per clock cycle) when processing a single thread due to the higher access latency involved in the memory access. However, patterns will typically be comprised of multiple characters, and therefore, the patterns related to the same rule will be detected with at least multiple cycles in between.

As can be seen from this description, embodiments of the invention allow the construction of a very powerful pattern-matching engine that is able to support multi-pattern rules, by mapping each rule in a straightforward matter on a simple state transition diagram that is executed by a multi-threaded multi-core B-FSM processor.

Whereas the first B-FSM array 12 of FIG. 1 may be comprised of 16 or 32 B-FSMs that are continuously active with processing the input streams, the second B-FSM array 14, in one embodiment, is regarded as a virtual array comprised of tens of thousands of B-FSMs, each executing a state transition diagram corresponding to one or multiple multi-pattern rules. Because, due to the nature of the match problem, at each moment in time, only few of the virtual 8-FSMs will be active, these can be implemented using the above-described multi-core multi-threaded B-FSM processor. A virtual B-FSM (i.e., the corresponding B-FSM thread) will be executed each time a pattern is detected in the first B-FSM array that is relevant for that virtual B-FSM. This is efficiently implemented by integrating an identifier of this B-FSM thread into the pattern ID that will be generated by the first B-FSM array, which will then be used to select the appropriate thread context for execution by the multi-threaded B-FSM processor as described.

Another aspect of the invention is that a compiler (or similar function) is able to exploit the available pattern and rule level match capabilities, to optimize the efficiency with which individual patterns are stored and searched by the pattern matching engine.

In this case, a pattern can be split into multiple subpatterns which are scanned for by the pattern scanner function in the first stage. For example a string pattern "abcdef" can be split into two subpatterns "abc" and "def" that can be scanned for in the first stage. If these two patterns are detected in an input stream, then the rule processor will check if the patterns are found in the order corresponding to the original pattern and at adjacent locations in the input stream. If the latter is the case, then this means that the original pattern "abcdef" has been found in the input stream.

As the example illustrates, the compiler now distribute the function that matches an individual pattern over the first pattern scanner stage and the second rule processor stage. This will allow improving the efficiency of the match engine, in particular for regular expressions that have a lot of overlap with other regular expressions, due to the use of the "dot" symbol (any character) and also when very large character classes are involved.

One example is also a "buffer-overflow" type of patterns such as "USER\s[\^n]{100}", in which it has to be checked if the string USER occurs in an input stream not followed by a newline character in the next 100 characters. By regarding "USER\s" and \n as separate patterns, this can be efficiently implemented by the match engine, with the rule processor doing the actual checking if there is no newline in the next 100 characters after "USER\s" has been detected, simply through checking of the offset values as described above.

This invention may be used in many fields including Intrusion Detection Systems (IDSs), image processing, biological systems, and others. Some image processors collect image data and then pre-process the data to prepare it to be correlated to reference data. Other systems, like speech recognition, are real time where the input data is compared in real time to reference data to recognize patterns. Once the patterns are "recognized" or matched to a reference, the system may output the reference. For example, a speech recognition system may output equivalent text to the processed speech patterns. Other systems, like biological systems, may use similar techniques to determine sequences in molecular strings like DNA.

While it is apparent that the invention herein disclosed is well calculated to fulfill the features stated above, it will be appreciated that numerous modifications and embodiments may be devised by those skilled n the art, and it is intended that the appended claims cover all such modifications and embodiments as fall within the true spirit and scope of the present invention.

What is claimed is:

1. A computer-implemented method of searching for a specified group of patterns in a data stream input into a computer system, the method comprising:
   identifying a multi-pattern rule for the group of patterns;
   inputting a data stream into a computer system, the computer system comprising one or more computer processor units;
   using first and second arrays of finite state machines executing on the one or more processor units, to scan the data stream for the patterns in the specified group of patterns, including
      splitting at least a first pattern of the specified group of patterns into a plurality of subpatterns,
      searching for the first pattern of the group of patterns using a first, pattern scanner function and a second, rule processor function, including
         using a compiler of the computer system to distribute the pattern scanner function to the first array of finite state machines and the rule processor function to the second array of finite state machines,
         using the first array of finite state machines, executing on the one or more processor units, to execute the pattern scanner function to scan the data stream for the subpatterns of said first pattern, and
         when all the subpatterns of the first pattern are found in the data stream, using the second array of finite state machines, executing on the one or more processor units, to execute the rule processor function to check if the subpatterns of the first pattern are found in the data stream in a specified order indicating that the first pattern is in the data stream;
   for each of the patterns in the specified group of patterns that are found in the data stream, sending a pattern identifier identifying said each pattern to the second array of finite state machines; and
   using the second array of finite state machines for determining if the patterns of the specified group of patterns are in the data stream in an order given by the identified multi-pattern rule.

2. The method according to claim 1, wherein the using a second array of finite state machines to check if the subpatterns are found in the data stream in a specified order includes using the second array of finite state machines to check if the subpatterns are found in the data stream in an order corresponding to a given original pattern.

3. The method according to claim 1, wherein the using a second array of finite state machines to check if the subpatterns are found in the data stream in a specified order includes using the second array of finite state machines to check if the subpatterns are found at adjacent locations in the data stream.

4. The method according to claim 1, wherein the using the second array of finite state machines for determining if any of the specified groups of patterns is in the data stream in accordance with the identified multi-pattern rule includes:
running a multitude of threads on the second array of finite state machines, each of the threads having a thread ID identifying said each thread, and
using said multitude of threads to determine whether any of the of specified groups of patterns is in the data stream.

5. The method according to claim 4, wherein:
the sending a pattern identifier identifying said each pattern includes including in said pattern identifier one of the thread IDs identifying one of said threads; and
the using said multitude of threads includes using said identified one of the threads to determine if said each pattern is part of one of the specified groups of patterns.

6. The method according to claim 5, wherein the using said multitude of threads includes using each of the threads to determine if a respective one of the specified groups of patterns is in the data stream.

7. The method according to claim 6, wherein the including in said pattern identifier one of the thread IDS, includes including in said pattern identifier a plurality of the thread IDs.

8. The method according to claim 7, wherein the sending the pattern identifier identifying said each pattern to a second array of finite state machines includes sending said each pattern to all the threads identified by the thread identifiers included in said pattern identifier.

9. The method according to claim 8, wherein the sending the pattern identifier identifying said each pattern to a second array of finite state machines further includes sending said each pattern to only the threads identified by the thread identifiers included in said pattern identifier.

10. The method according to claim 9, wherein the sending a pattern identifier identifying said each pattern to a second array of finite state machines includes sending said each pattern to the thread identified by the thread identifier included in said pattern identifier.

11. A computer-implemented finite state machine engine for searching for a specified group of patterns in a data stream input into a computer system, wherein at least a first pattern of the specified group of patterns is comprised of a plurality of subpatterns, the finite state machine engine comprising:
a rule memory holding a multi-pattern rule for identifying said specified group of patterns;
first and second arrays of finite state machines on one or more computer processor units to scan the data stream for the patterns in the specified group of patterns, including
splitting at least a first pattern of the specified group of patterns into a plurality of subpatterns,
searching for the first pattern of the group of patterns using a first, pattern scanner function and a second, rule processor function, including
using a compiler of the computer system to distribute the pattern scanner function to the first array of finite state machines and the rule processor function to the second array of finite state machines,
using the first array of finite state machines, executing on the one or more processor units, to execute the pattern scanner function to scan the data stream for the subpatterns of said first pattern, and
when all the subpatterns of the first pattern are found in the data stream, using the second array of finite state machines executing on the one or more processor units for checking if the subpatterns of the first pattern are found in the data stream in a specified order indicating that the first pattern is in the data stream; and wherein:
for each of the patterns in the specified groups of patterns that are found in the data stream, a pattern identifier identifying said each pattern is sent to the second array of finite state machines; and
the second array of finite state machines determines if the patterns of the specified group of patterns are in the data stream in an order given by the identified multi-pattern rule.

12. The finite state machine engine according to claim 11, wherein the second array of finite state machines checks if the subpatterns are found in the data stream in an order corresponding to a given original pattern.

13. The finite state machine engine according to claim 11, wherein the second array of finite state machines check if the subpatterns are found at adjacent locations in the data stream.

14. The finite state machine engine according to claim 11, wherein the determining if any of the specified groups of patterns is in the data stream in accordance with the identified multipattern rule includes running a multitude of threads on the second array of finite state machines, each of the threads having a thread ID identifying said each thread, and using said multitude of threads to determine whether any of the of specified groups of patterns is in the data stream.

15. The finite state machine engine according to claim 11, wherein:
the pattern identifier identifying said each pattern includes one of the thread IDs identifying one of said threads; and the second array of finite state machines uses said identified one of the threads to determine if said each pattern is part of one of the specified groups of patterns.

16. An article of manufacture comprising:
at least one computer usable hardware medium having computer readable program code logic to execute a machine instruction in a processing unit for using a computer for searching for a specified group of patterns in a data stream input into a computer system in accordance with a defined multi-pattern rule, said computer readable program code logic, when executing, performing the following:
using first and second arrays of finite state machines executing on one or more computer processor units, to scan the data stream for the patterns in the specified group of patterns, including
splitting at least a first pattern of the specified group of patterns into a plurality of subpatterns,
using the first array of finite state machines, executing on the one or more computer processor units, to execute the pattern scanner function to scan the data stream for the subpatterns of said first pattern, and
when all the subpatterns of the first pattern are found in the data stream, using the second array of finite state machines, executing on the one or computer processor units, to execute the rule processor function, to check if the subpatterns of the first pattern are found in the data stream in a specified order indicating that the first pattern is in the data stream;

for each of the patterns in the specified group of patterns that are found in the data stream, sending a pattern identifier identifying said each pattern to the second array of finite state machines; and using the second array of finite state machines for determining if the patterns of the specified group of patterns are in the data stream in an order given by the identified multi-pattern rule.

17. The article of manufacture according to claim 16, wherein the using a second array of finite state machines to check if the subpatterns are found in the data stream in a specified order includes using the second array of finite state machines to check if the subpatterns are found in the data stream in an order corresponding to a given original pattern.

18. The article of manufacture according to claim 16, wherein the using a second array of finite state machines to check if the subpatterns are found in the data stream in a specified order includes using the second array of finite state machines to check if the subpatterns are found at adjacent locations in the data stream.

19. The article of manufacture according to claim 16, wherein the using the second array of finite state machines for determining if any of the specified groups of patterns is in the data stream in accordance with the identified multi-pattern rule includes:

running a multitude of threads on the second array of finite state machines, each of the threads having a thread ID identifying said each thread, and using said multitude of threads to determine whether any of the of specified groups of patterns is in the data stream.

20. The article of manufacture according to claim 19, wherein:

the sending a pattern identifier identifying said each pattern includes including in said pattern identifier one of the thread IDs identifying one of said threads; and the using said multitude of threads includes using said identified one of the threads to determine if said each pattern is part of one of the specified groups of patterns.

* * * * *